(12) United States Patent
Park et al.

(10) Patent No.: US 11,171,915 B2
(45) Date of Patent: Nov. 9, 2021

(54) SERVER APPARATUS, CLIENT APPARATUS AND METHOD FOR COMMUNICATION BASED ON NETWORK ADDRESS MUTATION

(71) Applicant: ELECTRONICS AND TELECOMMUNICATIONS RESEARCH INSTITUTE, Daejeon (KR)

(72) Inventors: Kyung-Min Park, Daejeon (KR); Samuel Woo, Daejeon (KR); Dae-Sung Moon, Daejeon (KR); Ki-Jong Koo, Daejeon (KR); Ik-Kyun Kim, Daejeon (KR); Joo-Young Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 189 days.

(21) Appl. No.: 16/452,682

(22) Filed: Jun. 26, 2019

(65) Prior Publication Data

US 2020/0007496 A1    Jan. 2, 2020

(30) Foreign Application Priority Data

Jun. 29, 2018   (KR) .................. 10-2018-0076029
May 14, 2019   (KR) .................. 10-2019-0056476

(51) Int. Cl.
*G06F 15/16* (2006.01)
*H04L 29/12* (2006.01)
(Continued)

(52) U.S. Cl.
CPC ........ *H04L 61/2514* (2013.01); *H04L 9/0869* (2013.01); *H04L 61/2517* (2013.01);
(Continued)

(58) Field of Classification Search
CPC ............ H04L 61/2514; H04L 61/2517; H04L 61/2539
(Continued)

(56) References Cited

U.S. PATENT DOCUMENTS 7,831,822 B2   11/2010   Yoon et al.
8,341,721 B2   12/2012   Kim et al.
(Continued)

FOREIGN PATENT DOCUMENTS

JP   2012-156957 A   8/2012
KR   10-2005-0102892 A   10/2006
(Continued)

OTHER PUBLICATIONS

Luo et al., RPAH: Random Port and Address Hopping for Thwarting Internal and External Adversaries Publisher: IEEE, 2015, pp. 264-265 (Year: 2015).*

*Primary Examiner* — Hee Soo Kim
(74) *Attorney, Agent, or Firm* — NSIP Law

(57) ABSTRACT

Disclosed herein are a server apparatus, a client apparatus, and a method for communication based on network address mutation. The method for communication based on network address mutation, performed by the server apparatus and the client apparatus, includes setting the external address of a network interface for receiving a packet from the client apparatus; setting the internal address of a hidden interface in order to forward the packet received through the network interface to the hidden interface; modifying the external address based on a preset network address mutation rule; and communicating with the client apparatus by forwarding the packet, received from the client apparatus based on the modified external address, to the hidden interface.

20 Claims, 10 Drawing Sheets

(51) Int. Cl.
   *H04L 29/06* (2006.01)
   *H04L 9/08* (2006.01)
(52) U.S. Cl.
   CPC ...... *H04L 61/2539* (2013.01); *H04L 61/2557* (2013.01); *H04L 61/6022* (2013.01); *H04L 63/061* (2013.01); *H04L 63/08* (2013.01); *H04L 63/205* (2013.01)
(58) Field of Classification Search
   USPC ........................................................ 709/245
   See application file for complete search history.

(56) References Cited

U.S. PATENT DOCUMENTS

| | | | |
|---|---|---|---|
| 8,621,087 | B2 | 12/2013 | Kim et al. |
| 8,848,915 | B2 | 9/2014 | Park et al. |
| 9,825,914 | B2 * | 11/2017 | Sau .................... H04L 63/0428 |
| 9,876,757 | B2 | 1/2018 | Mitchell et al. |
| 2002/0056008 | A1 * | 5/2002 | Keane ................ H04L 63/0272 |
| | | | 709/245 |
| 2007/0162968 | A1 * | 7/2007 | Ferreira ............ H04L 29/12509 |
| | | | 726/12 |
| 2008/0298367 | A1 * | 12/2008 | Furukawa ......... H04L 29/12216 |
| | | | 370/392 |
| 2012/0023257 | A1 * | 1/2012 | Vos .................... H04L 61/2582 |
| | | | 709/232 |
| 2012/0198091 | A1 * | 8/2012 | Kanada ............... H04L 12/4641 |
| | | | 709/238 |
| 2016/0134587 | A1 * | 5/2016 | Wang .................. H04L 61/2514 |
| | | | 370/392 |
| 2017/0195295 | A1 * | 7/2017 | Tatlicioglu .......... H04L 63/0414 |
| 2017/0208032 | A1 * | 7/2017 | Cox .................... H04L 61/2567 |
| 2019/0379600 | A1 * | 12/2019 | Bisht .................. H04L 61/2514 |

FOREIGN PATENT DOCUMENTS

| | | |
|---|---|---|
| KR | 10-2010-0136255 A | 12/2010 |
| KR | 10-1210388 B1 | 12/2012 |
| KR | 10-1626405 B1 | 6/2016 |
| KR | 101626405 B1 * | 6/2016 |
| KR | 10-1861201 B1 | 5/2018 |

* cited by examiner

SERVER APPARATUS, CLIENT APPARATUS AND METHOD FOR COMMUNICATION BASED ON NETWORK ADDRESS MUTATION

CROSS REFERENCE TO RELATED APPLICATIONS

This application claims the benefit of Korean Patent Application No. 10-2018-0076029, filed Jun. 29, 2018, and No. 10-2019-0056476, filed May 14, 2019, which are hereby incorporated by reference in their entirety into this application.

BACKGROUND OF THE INVENTION

1. Technical Field

The present invention relates generally to technology for defending against attack behavior of attackers in a network environment, and more particularly to proactive defense technology and network address mutation technology for incapacitating reconnaissance efforts made by attackers.

2. Description of the Related Art

Before attackers attempt an actual attack, they conduct reconnaissance in order to find vulnerabilities in a target system. Attackers conduct reconnaissance using sniffing, probing and the like in order to acquire information about a target system (i.e., a host name, MAC/IP addresses, the type and version of an operating system (OS), open ports, and the types of services that are being operated).

Moving Target Defense (MTD) techniques aim to increase attackers' workload by making various properties of a target system less static, less homogeneous, and less deterministic. Accordingly, MTD techniques decrease the likelihood of a successful attack and add dynamics to a system so as to reduce the lifetime of an attack, thereby limiting damage from a large-scale attack. The main MTD techniques are categorized into dynamic networks, dynamic platforms, dynamic runtime environments, dynamic software, and dynamic data.

In the case of existing research on network address mutation, an address mutation method based on network address translation (NAT) and an address generation method using a cryptographic algorithm are used in order to generate and modify network addresses. However, because address mutation based on NAT is performed by network equipment such as a gateway, the actual address of the server to be protected may be exposed to an inside attacker in the same subnetwork in which the server to be protected is included.

FIG. 1 is a view that shows a system for communication based on network address mutation.

Referring to FIG. 1, a network address mutation method based on NAT has a disadvantage in that the network address of the server to be protected is exposed to an inside attacker in a network environment.

When a network address is generated using a cryptographic algorithm, the same output value may be generated in response to different input values; that is, a collision of addresses may occur. Existing techniques have proposed address generation methods, but are not concerned with address collision and address synchronization problems and do not propose a solution thereto.

The present invention proposes a network address mutation technique as a subcategory of dynamic networks technology. More particularly, the present invention proposes a network address mutation technique having improved security and efficiency by solving the most important two issues related to network address mutation.

Meanwhile, Korean Patent Application Publication No. 10-2005-0102892, titled "Communication system and method using multiple Internet Protocol (IP) addresses" discloses a communication system that is capable of communicating with an external network by applying multiple IP addresses thereto.

However, Korean Patent Application Publication No. 10-2005-0102892 has limitations in that, when an address modification rule is exposed, there may be a risk of an attack from an attacker, and address collision and address synchronization problems may be caused due to address modification.

SUMMARY OF THE INVENTION

An object of the present invention is to provide a proactive security technique, which increases costs for reconnaissance performed by an attacker in a network environment.

Another object of the present invention is to provide a secure communication channel between legitimate entities included in a network.

In order to accomplish the above objects, a method for communication based on network address mutation, performed by a server apparatus and a client apparatus, according to an embodiment of the present invention includes setting an external address of a network interface for receiving a packet from the client apparatus, and setting an internal address of a hidden interface in order to forward the packet, received through the network interface, to the hidden interface; modifying the external address based on a preset network address mutation rule; and communicating with the client apparatus by forwarding a packet received from the client apparatus through the modified external address to the hidden interface.

Here, the method may further include, after modifying the external address, changing the address of the gateway of the hidden interface to the modified external address.

Here, communicating with the client apparatus may be configured to map the external address, identified at the time at which connection between the server apparatus and the client apparatus is established, to the Media Access Control (MAC) address of the server apparatus and to store the mapped addresses in a table.

Here, each of multiple external addresses may be mapped to the MAC address and recorded in the table.

Here, communicating with the client apparatus may be configured to receive a packet from the client apparatus through any one of the multiple external addresses recorded in the table, thereby maintaining network connection between the server apparatus and the client apparatus.

Here, the method may further include, before setting the external address, generating pseudonymous address information used to set the external address of the network interface, through which the server apparatus receives a packet from the client apparatus.

Here, generating the pseudonymous address information may be configured to generate the pseudonymous address information including multiple pseudonymous IP addresses and multiple pseudonymous port numbers generated from random values using a preset function.

Here, modifying the external address may be configured to modify the external address using any one of the multiple pseudonymous IP addresses and any one of the multiple pseudonymous port numbers based on the preset network address mutation rule at preset intervals, the multiple pseudonymous IP addresses and the multiple pseudonymous port numbers being included in the pseudonymous address information.

Here, the method may further include, before generating the pseudonymous address information, performing authentication for the server apparatus and the client apparatus and sharing a session key between the successfully authenticated server apparatus and client apparatus.

Here, the preset function may generate the random values using the session key.

Also, in order to accomplish the above objects, a server apparatus according to an embodiment of the present invention includes one or more processors; and executable memory for storing at least one program executed by the one or more processors. The at least one program may be configured to set an external address of a network interface for receiving a packet from a client apparatus, to set an internal address of a hidden interface in order to forward the packet received through the network interface to the hidden interface, to modify the external address based on a preset network address mutation rule, and to forward a packet received from the client apparatus through the modified external address to the hidden interface, thereby communicating with the client apparatus.

Here, the one or more processors may change the address of the gateway of the hidden interface to the modified external address.

Here, the at least one program may map the external address, identified at the time at which connection with the client apparatus is established, to the Media Access Control (MAC) address of the server apparatus and record the mapped addresses in a table.

Here, each of multiple external addresses may be mapped to the MAC address and recorded in the table.

Here, the at least one program may receive a packet from the client apparatus through any one of the multiple external addresses recorded in the table, thereby maintaining network connection with the client apparatus.

Here, the at least one program may generate pseudonymous address information used to set the external address of the network interface for receiving a packet from the client apparatus.

Here, the at least one program may generate pseudonymous address information including multiple pseudonymous IP addresses and multiple pseudonymous port numbers generated from random values using a preset function.

Here, the at least one program may perform authentication for the client apparatus and share a session key with the successfully authenticated client apparatus.

Here, the preset function may generate the random values using the session key.

Also, in order to accomplish the above objects, a client apparatus according to an embodiment of the present invention includes one or more processors; and executable memory for storing at least one program executed by the one or more processors. The at least one program may be configured to set an external address of a network interface of a server apparatus in order to transmit a packet to the server apparatus, to set the external address modified based on a preset address mutation rule as a destination address, and to transmit a packet to the external address of the server apparatus, thereby communicating with the server apparatus.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
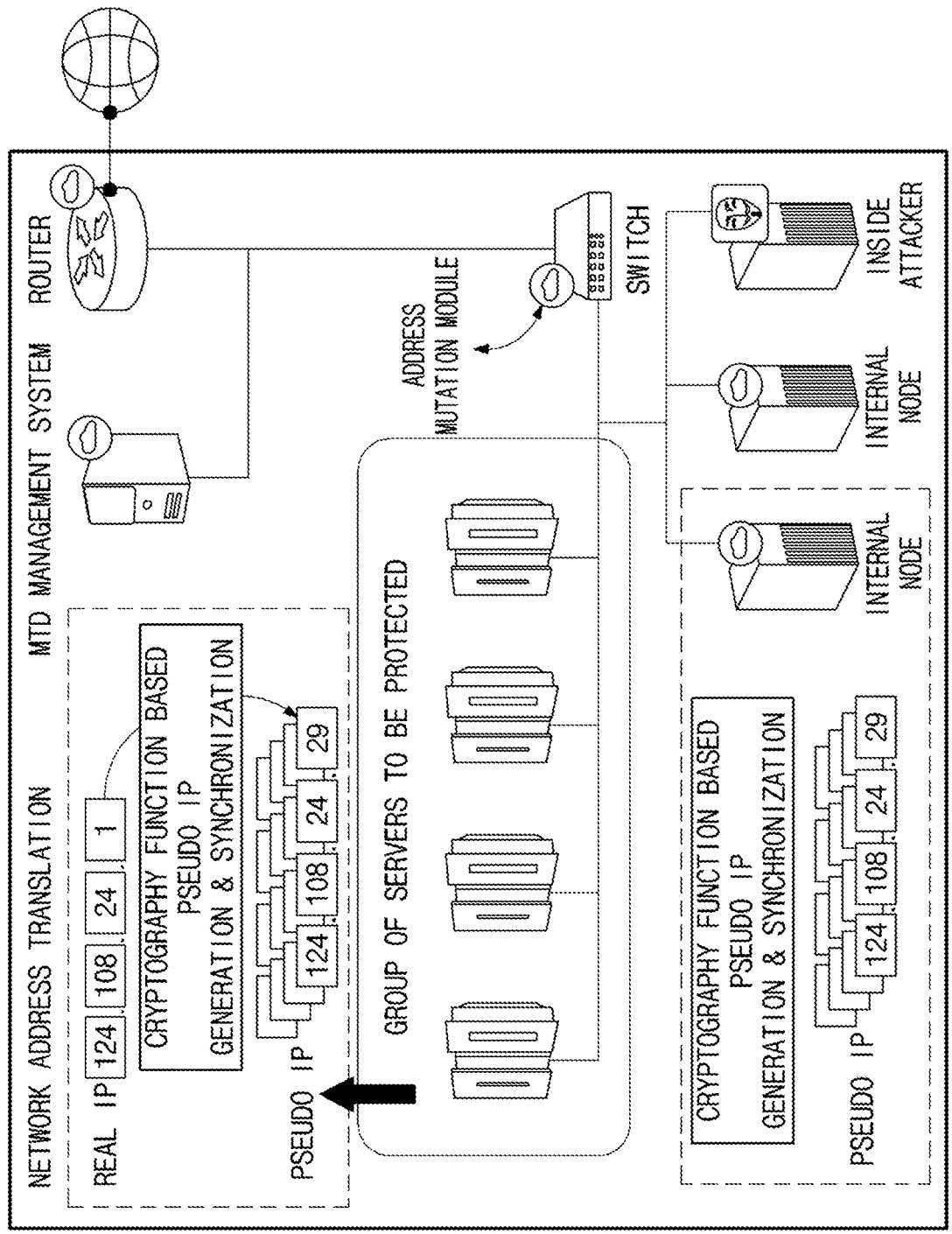
FIG. 1 is a view that shows a system for communication based on network address mutation.

The present invention will be described in detail below with reference to the accompanying drawings. Repeated descriptions and descriptions of known functions and configurations which have been deemed to unnecessarily obscure the gist of the present invention will be omitted below. The embodiments of the present invention are intended to fully describe the present invention to a person having ordinary knowledge in the art to which the present invention pertains. Accordingly, the shapes, sizes, etc. of components in the drawings may be exaggerated in order to make the description clearer.

Throughout this specification, the terms "comprises" and/or "comprising" and "includes" and/or "including" specify the presence of stated elements but do not preclude the presence or addition of one or more other elements unless otherwise specified.

Hereinafter, a preferred embodiment of the present invention will be described in detail with reference to the accompanying drawings.

Figure 2:
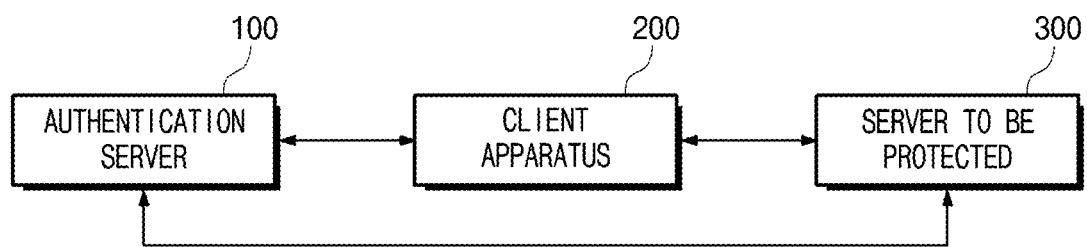
FIG. 2 is a block diagram that shows a system for communication based on network address mutation according to an embodiment of the present invention.

FIG. 2 is a block diagram that shows a system for communication based on network address mutation according to an embodiment of the present invention.

Referring to FIG. 2, the system for communication based on network address mutation may include an authentication server 100, a client apparatus 200, and a server to be protected (server apparatus) 300.

The authentication server 100 may authenticate the client apparatus 200 and the server to be protected 300.

The client apparatus 200 and the server to be protected 300 may request the authentication server 100 to perform authentication. Also, the client apparatus 200 and the server to be protected 300 may generate a session key and distribute the session key among only the authenticated entities.

Here, the client apparatus 200 and the server to be protected 300 may generate and distribute the session key to use in a subnetwork.

Here, the client apparatus 200 and the server to be protected 300 may generate pseudonymous address information using the session key.

Also, the client apparatus 200 and the server to be protected 300 may track a network address based on network address mutation.

Here, the server to be protected 300 may generate pseudonymous address information and modify the network address thereof using the pseudonymous address information.

Here, the client apparatus 200 may generate pseudonymous address information and track the modified network address of the server to be protected 300 using the pseudonymous address information.

Here, the server apparatus 300 may generate pseudonymous address information that is used in order to set the external address of a network interface for receiving a packet from the client apparatus 200.

Here, the client apparatus 200 may generate pseudonymous address information that is used in order to track the external address of the network interface through which the server apparatus 300 receives a packet from the client apparatus 200.

Here, the client apparatus 200 and the server to be protected 300 may perform secure communication by modifying a network address based on a preset network address mutation rule when transmitting and receiving packets.

Figure 3:
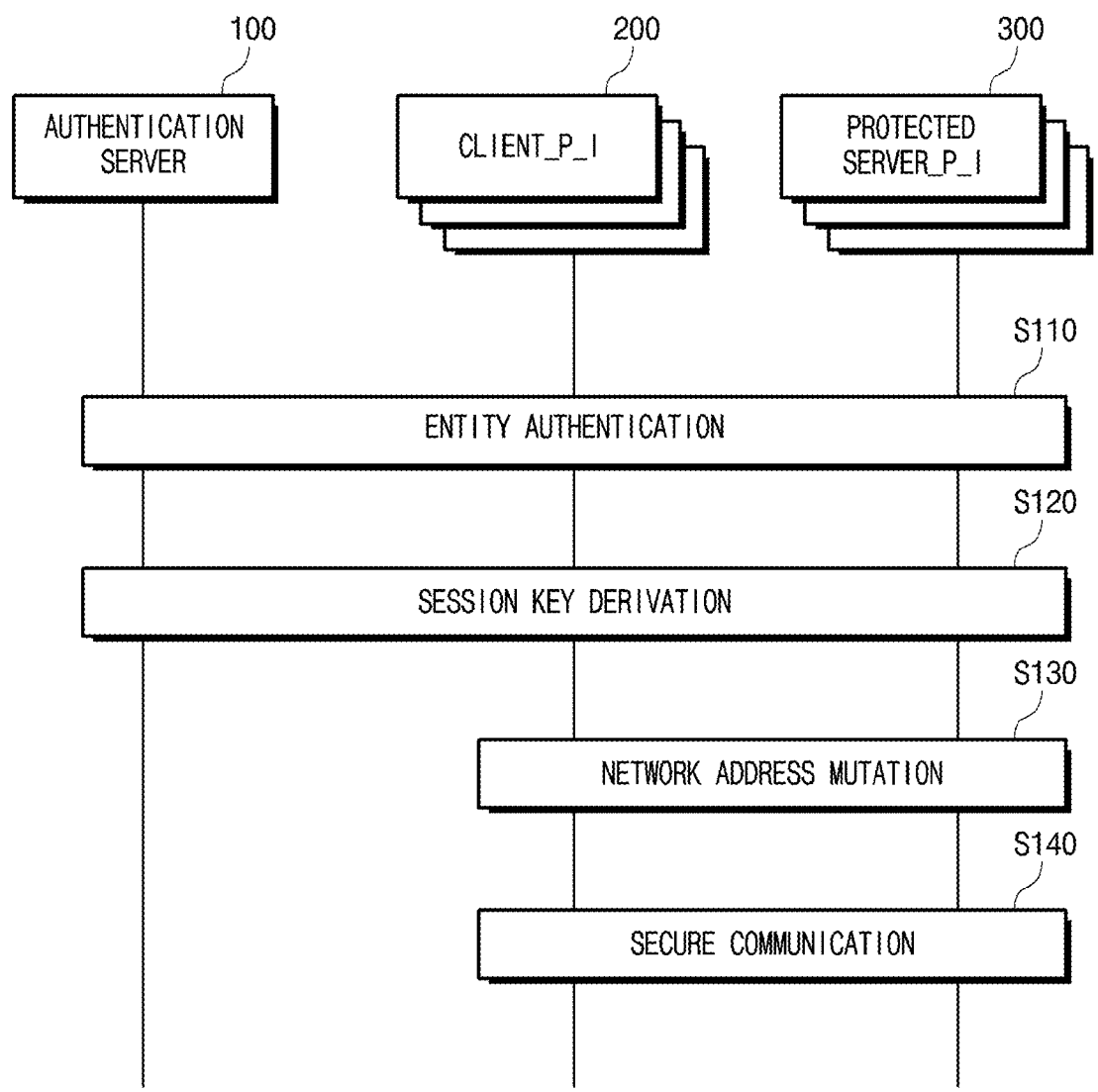
FIG. 3 is a sequence diagram that shows a method for communication based on network address mutation according to an embodiment of the present invention.
Figure 4:
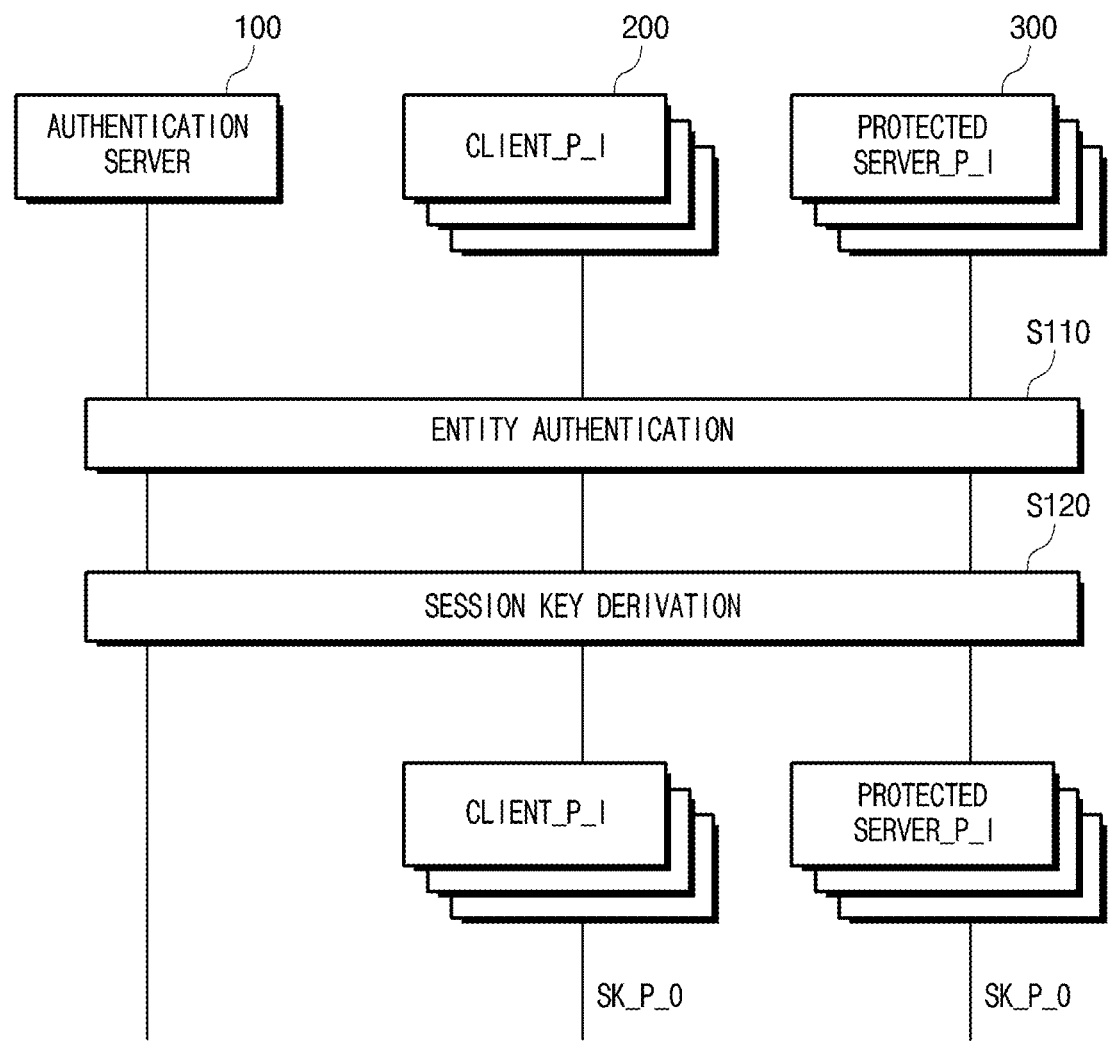
FIG. 4 is a sequence diagram that shows an example of the step of authentication and session key sharing illustrated in FIG. 3.
Figure 5:
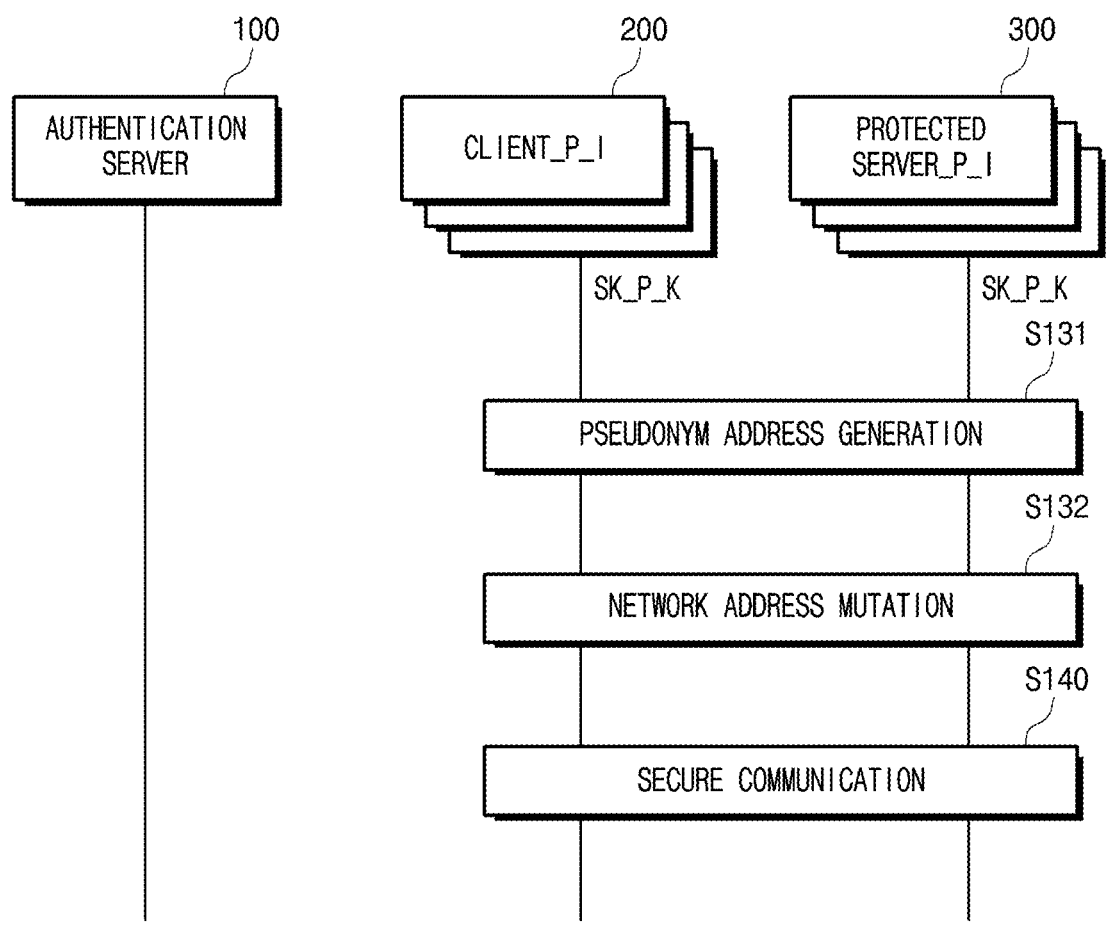
FIG. 5 is a sequence diagram that shows an example of the network address mutation step illustrated in FIG. 3.

FIG. 3 is a sequence diagram that shows a method for communication based on network address mutation according to an embodiment of the present invention. FIG. 4 is a sequence diagram that shows an example of the step of authentication and session key sharing illustrated in FIG. 3. FIG. 5 is a sequence diagram that shows an example of the network address mutation step illustrated in FIG. 3.

Referring to FIG. 3, through a server apparatus, a client apparatus, and a method for communication based on network address mutation according to an embodiment of the present invention, pseudonymous address information generation, network address synchronization, and communication may be performed. The present invention may include two steps (the step of authentication and session key distribution and the step of network address mutation and secure communication).

Table 1 describes notation used in the present invention.

TABLE 1

| | |
|---|---|
| Server_p_j | the j-th server to be protected, which is included in the subnetwork "p" |
| Client_p_i | the client "i" provided with a service from the server "Server_p_j" to be protected, which is included in the subnetwork "p" |
| SK_p_k | a secret key (symmetric key) used when Server_p_j and Client_p_i generate a pseudonymous address in the k-th session |
| IP_j_k_c | an IP address used when the j-th server to be protected performs c-th address mutation in the k-th session |
| PORT_j_s_k_c | a port used when the service "s", which is provided by the j-th server to be protected, performs c-th address mutation in the k-th session. (A single server to be protected may provide multiple services. The multiple services are identified by individual processes, and the individual processes must use different ports.) |
| $T_p$ | the standard time used in the subnetwork "p" (hours: minutes: seconds) |
| $\alpha_p$ | the number of servers to be protected in the subnetwork "p" |
| $\alpha_{p\_j}$ | the number of processes running on Server_p_j |
| $CTR_h$ | the number of recursive calls of a function for generating a random value |
| Hx( ) | a one-way hash function using "x" as a key, which is used to generate a random value<br>Hx: $\{0, 1\}^* \times key \rightarrow \{0, 1\}^{256}$ |
| V | the output value of a one-way hash function to be used to generate an IP address, a random value |
| vX | the random value V divided by n bits |
| V' | a set of vXs from which repeated values are eliminated |
| V" | a set of $\alpha_p$ pseudonymous IP addresses |
| P | the output value of a one-way hash function to be used to generate a port number, a random value |
| pX | the random value P divided by 16 bits |
| P' | a set of pXs from which repeated values are eliminated |
| P" | a set of $\alpha_{p\_j}$ pseudonymous port numbers |
| f( ) | a function for generating a pseudonymous address (IP address, port number) |

Steps S110 and S120 are preparation steps for pseudonymous address generation and synchronization.

At steps S110 and S120, entity authentication methods (i.e., certificate-based authentication and certificateless authentication) and key management methods (i.e., key distribution and update), which are currently used in general IT environments, may be used.

At steps S110 and S120, various types of entity authentication methods and key management methods may be used.

At steps S110 and S120, a session key, which is used in order to generate pseudonymous address information, may be generated and shared.

Referring to FIG. 4, at step S110, the authentication server 100 may perform entity authentication for the client apparatus 200 and the server apparatus 300.

At step S110, the client apparatus (Client_p_i) 200 and the server apparatus (the server to be protected, Server_p_j) 300 may be authenticated by the authentication server 100.

Here, at step S110, only the authenticated entities may perform the session key generation and distribution process at step S120.

At step S120, the client apparatus (Client_p_i) 200 and the server apparatus (the server to be protected, Server_p_j) 300 may generate and distribute a session key.

Here, at step S120, when the entity authentication and session key distribution process is completed normally, the client apparatus (Client_p_i) 200 and the server apparatus (Server_p_j) 300 may share the same group session key "SK_p_k". Because step S120 is the first step at which the system commences, step S120 may correspond to the zeroth session. Here, SK_p_k is a secret key used to generate a pseudonymous address, and may be obtained only by legitimate entities.

Here, at step S120, the client apparatus (Client_p_i) 200 and the server apparatus (Server_p_j) 300 may generate and distribute a session key to use in the subnetwork "p" in which they are included.

Here, at step S120, the authentication server 100 or the client apparatus (Client_p_i) 200 and the server apparatus (Server_p_j) 300 may autonomously generate a session key and distribute the group session key "SK_p_k" for generating pseudonymous address information.

The entities that complete steps S110 and S120 normally may receive the session key "SK_p_0" to use in the zeroth session and use the same in order to generate pseudonymous address information.

Here, the session key "SK_p_k" to be used in the k-th session may be generated by additionally performing a session key update process.

Referring to FIG. 5, at step S130, pseudonymous address information to be used for network address mutation may be generated and synchronized.

Here, at step S130, the network address of the server apparatus (Server_p_j) 300 may be modified using the pseudonymous address information.

Step S130 may include step S131 for generating and synchronizing pseudonymous address information and step S132 for modifying the network address of the server apparatus (Server_p_j) 300 using the pseudonymous address information, which is generated at step S131, along with the client apparatus (Client_p_i) 200.

Step S130 may be performed through the interaction between the server apparatus (Server_p_j) 300 and the client apparatus (Client_p_i) 200.

Before a description of step S130, assumptions pertaining to the server apparatus 300 and the client apparatus 200 according to an embodiment of the present invention will be described below.

For example, the subnetwork "p" in which the server apparatus (Server_p_j) 300 is included may use the IPv4 addressing system.

When xxx.xxx.xxx.xxx is used as a subnet mask, the mask may be $\beta$ bits, an available IP address may range from 0 to $2^n-1$, and n may be calculated to $32-\beta$ (n=32-$\beta$).

For example, when the subnet mask is 255.255.255.0, because $\beta$ is 24 ($\beta$=24) and n is 8 (n=8), the range of an available IP address octet may be 0 to 255. In this case, the generated address has a size of 8 bits. Among 8-bit addresses, three addresses are used as a network address, a gateway address, and a broadcast address by default, and the remaining addresses may be assigned to hosts in the subnetwork.

Here, the number of server apparatuses (Server_p_j) 300 in the corresponding subnetwork may be $\alpha_p$.

The server apparatuses (Server_p_j) 300 may have a session key, which is distributed thereto after they are authenticated normally.

Here, all of the server apparatuses 300 and the client apparatuses 200 may be in the state in which time is synchronized therebetween. Also, all of the server apparatuses 300 and the client apparatuses 200 may autonomously generate an address according to a preset rule based on the session key, which is distributed through the above-described process, without exchanging messages.

Referring again to FIG. 5, at step S131, pseudonymous address information may be generated.

That is, at step S131, pseudonymous address information, which is used in order to set the external address of a network interface, through which the server apparatus 300 receives a packet from the client apparatus 200, may be generated.

Here, at step S131, pseudonymous address information, including multiple pseudonymous IP addresses and multiple pseudonymous port numbers, may be generated from random values using a preset function.

Here, the preset function may generate a random value using the session key.

Here, at step S131, a random value to be used as pseudonymous address information may be generated.

Here, at step S131, a one-way hash function may be used to generate a random value.

Equation (1) shows an example of an algorithm (i.e., a one-way hash function) for generating a random value.

$$h_{SK\_p\_k}(T_p \| CTR_h) = V \qquad (1)$$

The function $h_{SK\_p\_k}( )$ is a one-way hash function that uses SK_k as a secret key, and the size of an output value may vary depending on the one-way hash function that is used.

Also, at step S131, a pseudonymous IP address may be generated.

Here, at step S131, $\alpha_p$ different pseudonymous IP addresses, each of which has a size of n bits, may be generated.

Here, at step S131, the server apparatus (Server_p_j) 300 may generate as many pseudonymous IP addresses as the number ($\alpha_p$) of all server apparatuses (Server_p_j) 300 in the subnetwork "p". When the subnet mask of the corresponding subnetwork is xxx.xxx.xxx.xxx and the mask is 13 bits, the server apparatus (Server_p_j) 300 may need an n-bit pseudonymous IP address.

Here, at step S131, in order to use the random value V as a pseudonymous IP address, V is divided by n bits, and repeated values may be eliminated.

Here, at step S131, after repeated values are eliminated, $\alpha_p$ pseudonymous IP addresses, each of which has a size of n bits, are generated, whereby pseudonymous IP addresses to be used for address mutation may be generated. The algorithm for generating a different pseudonymous IP addresses, each of which has a size of N bits, may be represented as shown in Equation (2).

$$f(h_{SK\_p\_k}(T_p \| CTR_h)) = \{v1, v2, \ldots, v\alpha\} \qquad (2)$$

The function f( ) may be a function that recursively calls Equation (1) until $\alpha_p$ different pseudonymous IP addresses, each of which has a size of N bits, are generated.

At step S131, first, V may be divided by n bits.

$$V = \{v1, v2, \ldots, vx\}$$

Here, at step S131, when the number of bits of V is not a multiple of n, residual bits may be eliminated therefrom.

Here, at step S131, repeated values may be eliminated from the elements of V.

$$V' = \{v1, v2, \ldots, vY\} \ (Y = <X)$$

Here, at step S131, when Y is less than $\alpha_p$, $CTR_h$ is increased by 1, and then Equation (1) may be recursively called.

Here, at step S131, the above-described process is repeatedly performed until Y becomes equal to $\alpha_p$ (Y=$\alpha_p$), whereby $\alpha_p$ pseudonymous IP addresses, each of which has a size of n bits, may be generated.

$$V''=\{v1,v2,\ldots,v\alpha_p\}$$

Also, at step S131, a pseudonymous port number may be generated.

Here, at step S131, the server apparatus (Server_p_j) 300 may generate as many pseudonymous port numbers as the number of processes ($\alpha_{p\_j}$) that are providing network services, among the processes running thereon. Generally, a port number may be set to a number that falls within a range from 0 to 65535.

Here, at step S131, the server apparatus (Server_p_j) 300 may generate $\alpha_{p\_j}$ pseudonymous port numbers, each of which has a size of 16 bits. The method of generating a pseudonymous port number is as follows.

In order to use a random value P as a pseudonymous address, P may be divided by 16 bits, and repeated values may be eliminated. After repeated values are eliminated, when $\alpha_{p\_j}$ pseudonymous addresses, each of which has a size of 16 bits, are generated, pseudonymous port numbers to be used for port mutation may be generated. The algorithm for generating $\alpha_{p\_j}$ different pseudonymous port numbers, each of which has a size of 16 bits, may be represented as shown in Equation (3).

$$f(h_{SK\_p\_k}(T_p\|CTR_h))=\{p1,p2,\ldots p\alpha_{p\_j}\} \quad (3)$$

Here, at step S131, first, P may be divided by 16 bits.

$$P=\{p1,p2,\ldots,pX\}$$

Here, at step S131, when the number of bits of P is not a multiple of 16, residual bits may be eliminated therefrom.

Here, at step S131, repeated values may be eliminated from the elements of P.

$$P'=\{p1,p2,\ldots,pY\} \quad (Y=<X)$$

Here, at step S131, when Y is less than $\alpha_{p\_j}$, $CTR_h$ is increased by 1, and then Equation (3) may be recursively called.

Here, at step S131, the above-described process is repeatedly performed until Y becomes equal to $\alpha_{p\_j}$ (Y=$\alpha_{p\_j}$), whereby $\alpha_{p\_j}$ pseudonymous addresses, each of which has a size of 16 bits, may be generated.

$$P''=\{p1,p2,\ldots,p\alpha_{p\_j}\}$$

Also, at step S131, pseudonymous address information may be stored.

Here, at step S131, the server apparatus (Server_p_j) 300, which generated $\alpha_p$ pseudonymous IP addresses to use for C-th address mutation in the K-th session, may securely store V''={v1, v2, . . . , v$\alpha_p$} as pseudonymous address information in the storage thereof.

Here, at step S131, the server apparatus (Server_p_j) 300 may securely manage the address storage.

Here, at step S131, the server apparatus (Server_p_j) 300, which generated $\alpha_{p\_j}$ pseudonymous port numbers to use for C-th address mutation in the K-th session, may securely store P''={p1, p2, p$\alpha_{p\_j}$} as pseudonymous address information in the storage thereof.

Here, at step S131, the server apparatus (Server_p_j) 300 may securely manage the address storage.

Also, at step S132, network address mutation may be performed.

That is, at step S132, first, the external address of a network interface, through which the server apparatus 300 receives a packet from the client apparatus 200, may be set, and the internal address of a hidden interface for forwarding the packet, received through the network interface, to the hidden interface may be set.

Here, at step S132, in order to enable the server apparatus 300 to communicate with the client apparatus 200 even though the external address is modified, network configuration for forming a hidden tunnel may be set through the following process before address mutation is performed.

Here, at step S132, first, a hidden interface having an individual MAC address may be generated.

Here, at step S132, an arbitrary IP address (a hidden address) is assigned to the hidden interface, whereby the internal address (IP address, netmask) may be set.

Here, at step S132, the address of the default gateway of the hidden interface may be set as the IP address (external address) of the network interface for which address mutation is to be performed.

Here, at step S132, in order to forward a packet, entering through a port matching the pseudonym address information, to the hidden interface, among incoming packets from the client apparatus 200, the destination address of the packet may be set based on destination Network Address Translation (NAT) (IP address/port number).

Here, at step S132, the source address of a packet originating from the connection with the hidden interface, among outgoing packets transmitted to the client apparatus 200, may be set based on source NAT (IP address/Port number).

Also, at step S132, the client apparatus 200 may set a network configuration.

Here, at step S132, the destination address of a packet directed to the connection with the hidden interface of the server apparatus 300, among outgoing packets transmitted to the server apparatus 300, may be set based on destination NAT (IP address/port number).

Also, at step S132, address mutation may be performed on the server side, and address tracking may be performed on the client side.

That is, at step S132, the external address may be modified based on a preset network address mutation rule.

Here, at step S132, the server apparatus 300 may continuously modify the external address of the network interface based on the process of the pseudonymous address information generation step (S131) at specific times set according to a preset period.

Here, at step S132, the server apparatus 300 may modify the external address using any one of the multiple pseudonymous IP addresses and any one of the multiple pseudonymous port numbers based on the preset address mutation rule at preset periods, the multiple pseudonymous IP addresses and the multiple pseudonymous port numbers being included in the pseudonymous address information.

Here, the preset function may generate a random value using a session key shared between the server apparatus 300 and the client apparatus 200, which are successfully authenticated as the result of authentication performed at step S110.

Here, at step S132, the client apparatus 200 includes the same address generation mechanism as the server apparatus 300 such that the external address of the server apparatus 300 is continuously modified, thereby tracking the network address of the server apparatus 300.

Here, at step S132, the server apparatus 300 and the client apparatus 200 may update the network configuration as follows in order to prevent the connection from being lost whenever the external address is modified. All of the processes of step S132 may be simultaneously performed by the server apparatus 300 and the client apparatus 200 based on the preset address mutation rule at address mutation intervals (at specific times).

First, at step S132, the server apparatus 300 may modify the external address of the network interface (the IP address of eth0) based on the preset network address mutation rule.

Here, at step S132, the server apparatus 300 may change the address of the default gateway of the hidden interface to the modified external address.

Here, at step S132, the server apparatus 300 may update a configuration table in order to forward a packet that satisfies the address mutation rule to an address based on the destination NAT, among incoming packets received through the external address of the network interface (external interface).

Here, at step S132, the server apparatus 300 may update the configuration table in order to drop a packet that does not satisfy the address mutation rule, among the incoming packets received through the external address of the network interface.

Here, at step S132, a connection filter may be formed in order to detect a suspicious connection and forcibly disconnect the suspicious connection.

Here, at step S132, such a suspicious connection may be distinguished using various connection filtering methods, and the suspicious connection may be forcibly disconnected based on connection filtering methods at every address mutation interval.

Here, at step S132, whenever a new connection is established, the validity thereof may be checked through a separate connection-monitoring process.

Here, at step S132, a specific source port number of the client apparatus 200 is set, and when a connection that does not match the set source port number is established, the connection may be determined to be a suspicious connection.

Originally, the source port number is set by sequentially assigning a value falling within a range defined by an OS. However, when the source port number is specified, an attacker faces added pressure to specify the source port number as well as the IP address and port number of the server. Consequently, in order to connect to a hidden tunnel and maintain the connection, an attacker must find a destination IP address, a destination port number, and a source port number. Accordingly, when an attacker estimates a hidden tunnel based on Class-C IP addresses, the complexity may be represented as shown in Equation (4).

$$(2^8-k) \times (2^{16}-l) \times (2^{16}-m) = 2^{40} - (k+l+m) \quad (4)$$

Here, k, l and m may be constants, which are set in consideration of exclusions depending on the network state or service ports.

Also, at step S132, the client apparatus 200 may track the external address modified in the server apparatus 300 based on the preset network address mutation rule.

Here, at step S132, the client apparatus 200 may update a destination NAT table such that the destination address of a packet for establishing connection to the internal address (hidden address) of the server apparatus 300 is changed to the external address of the server apparatus 300 in an application layer.

Here, at step S132, the client apparatus 200 may update a source NAT table such that the source port number of a packet, the destination address of which is changed through destination NAT, is changed to a preset port number (which may be changed by being newly generated at every preset mutation interval).

Here, at step S132, the client apparatus 200 may delete connection tracking information in which a TCP connection state is "SYN_SENT".

Here, at step S132, when address mutation happens before a TCP[SYN] packet arrives at the server apparatus 300, the TCP[SYN] packet is retransmitted after a retransmission timeout (RTO), in which case the destination thereof may be recorded in a SYN_SENT connection tracking table, which is generated when the TCP[SYN] packet was transmitted in the previous period.

That is, because the client apparatus 200 repeatedly transmits the TCP[SYN] packet to the old external address of the server apparatus 300 rather than the modified external address, step S132 may be performed for recovery when a 3-way handshake fails. This may be used to arithmetically define the minimum address mutation period in an address mutation technique. Because the time taken for a TCP[SYN] packet to arrive at the server is calculated as the round trip time (RTT) divided by 2 (RTT/2), the minimum address mutation period that is theoretically (ideally) possible in the present invention may be represented as shown in Equation (5).

$$\frac{RTT}{2} + k \quad (5)$$

In Equation (5), if the server apparatus 300 and the client apparatus 200 are able to ideally synchronize time without an error and if the processing time for address mutation is constant, k may become 0. However, because it is impossible in practice to satisfy these conditions, k may be a constant value that should be added in consideration of a slight error in time synchronization and address mutation processing time of the server apparatus 300 and the client apparatus 200.

Also, at step S140, the server apparatus 300 and the client apparatus 200 may perform secure communication using the modified external address.

Here, at step S140, when the first source address information of the client apparatus 200, which is predefined based on the preset address mutation rule, is the same as the second source address information of the client apparatus 200, which is included in a packet transmitted from the client apparatus 200, the server apparatus 300 may forward the packet to the hidden interface.

Here, at step S140, when the first source address information of the client apparatus 200, which is predefined based on the preset address mutation rule, is not identical to the second source address information of the client apparatus 200, which is included in the packet transmitted from the client apparatus 200, the server apparatus 300 may block the access by the client apparatus 200.

Here, at step S140, the server apparatus 300 may include the source address information thereof, corresponding to the internal address based on the preset address mutation rule, in a packet and transmit the packet to the client apparatus 200.

Here, at step S140, server tracking through packet eavesdropping may be prevented.

Here, at step S140, it is possible to respond to an attack model in which an attacker that intrudes into a network finds the current address that enables access to the server apparatus 300 by monitoring the traffic between the server apparatus 300 and the client apparatus 200 and by checking the header of an IP packet through packet eavesdropping.

For example, it may be assumed that the address of the server apparatus 300 changes to any one of A1 to A10. If connection to A1 is established, A1 may be recorded as the IP address of the server apparatus 300 in a packet when the destination or the source of the packet is set. Then, even though the address of the server apparatus 300 changes to any one of A2 to A10, the connection is maintained, but the address set when the connection to A1 is established may be recorded as the address of the server apparatus 300 in the packet header.

That is, regardless of the current address of the server apparatus, network communication may be performed using the external address of the previously established connection. Accordingly, after the address is changed from A1 to another address, an attacker is not able to determine the current address of the server apparatus 300 even though the attacker eavesdrops on packets.

However, it is possible that the attacker finds the address of the server apparatus 300 by eavesdropping on packets before connection to A1 is finished. That is, before the corresponding connection is disconnected in the next address mutation period, the attacker may secure sufficient time to launch an attack.

Accordingly, in order to enable a packet, the destination of which differs from the address of the server apparatus 300, to arrive at the server apparatus 300, the present invention may use N:1 mapping between IP addresses and a MAC address in an Address Resolution Protocol (ARP) table.

It may be assumed that the MAC address of the server apparatus 300 is MAC[S] and that the IP address thereof changes to any one of IP_T1[S] to IP_T10[S]. When connection to IP_T1 [S] is established, {IP_T1 [S]: MAC[S]} is recorded in the ARP table. Then, when the IP address of the server apparatus 300 is changed during communication, {IP_T1[S]~IP_T10[S]: MAC[S]} may be recorded in the ARP table. Accordingly, even though the IP address varies on the network, a packet may reach at least the external interface of the server apparatus 300 because the MAC address thereof is fixed.

Subsequently, through the local packet processing flow on the OS and a destination NAT table set in an initial network configuration process, the destination IP address of a packet may be changed to the internal address (hidden address) as soon as the packet is passed to an OS layer, and whether the packet matches the IP address of the server apparatus 300 may be determined. Because the server apparatus 300 has a hidden interface generated in the initial network configuration process as well as the external interface thereof, when the packet is recognized as the packet destined therefor, the packet may be passed to the upper layer via the IP layer.

Because the above-described method is based on N:1 mapping in the ARP table, if any of N addresses falling within the IP address mutation range of the server apparatus 300 is assigned to another server apparatus, the connection is disconnected. Therefore, respective server apparatuses 300 that perform address mutation are required to split addresses that fall within an address range allocated to their subnetwork therebetween and to avoid using addresses assigned to other server apparatuses. If the above conditions are applied when there are N server apparatuses 300 based on Class-C IP addresses, the complexity of prediction of a hidden tunnel by an attacker may be represented as shown in Equation (6).

$$(2^8-k)/N+(2^{16}-l)\times(2^{16}-m) \qquad (6)$$

That is, at step S140, the external address at the time at which the connection between the server apparatus and the client apparatus is established and the MAC address of the server apparatus are mapped, and may then be recorded in a table.

Here, each of the multiple external addresses may be mapped to the MAC address and recorded in the table, and the table may be the ARP table.

Figure 6:
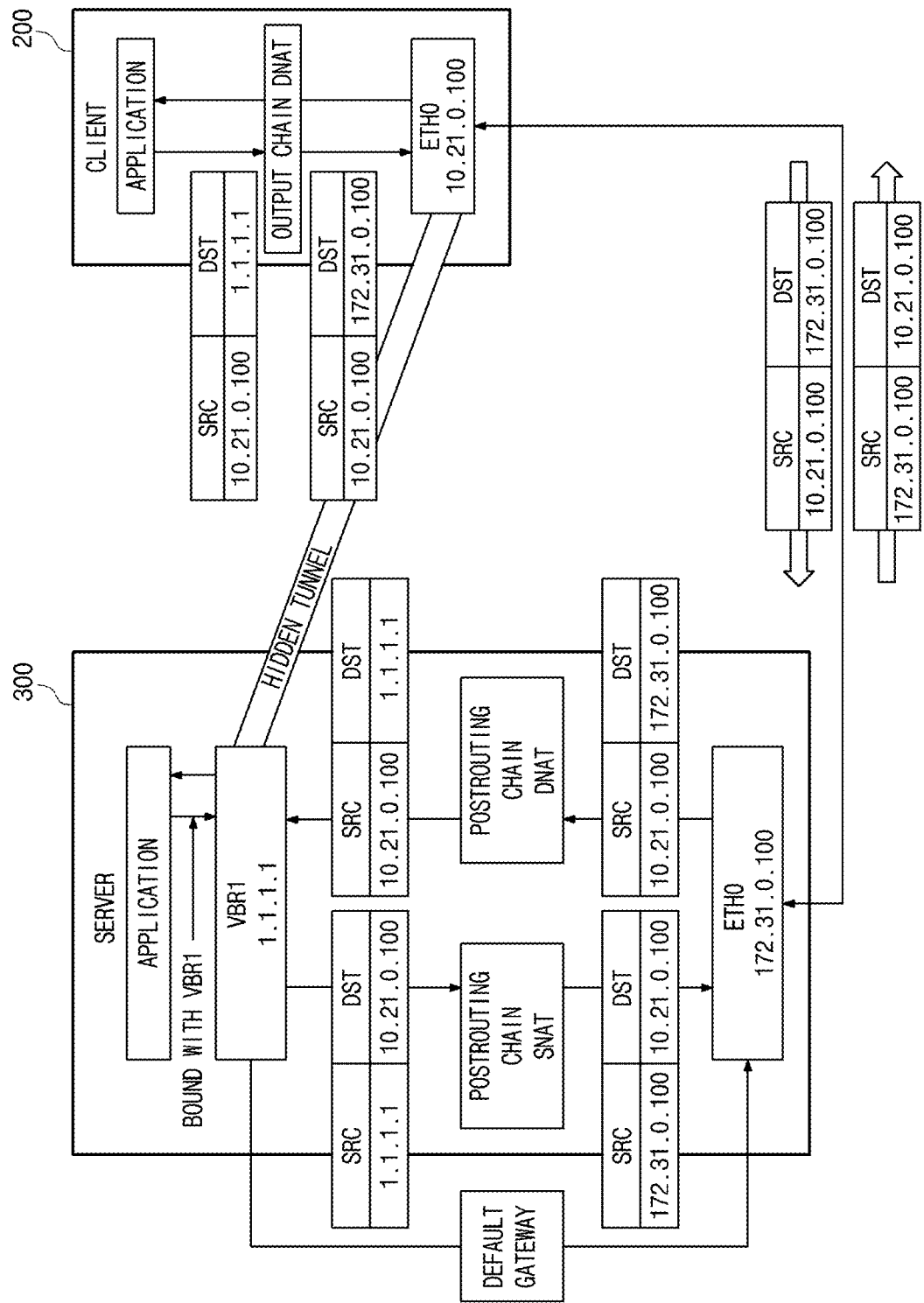
FIG. 6 is a view that shows a method for communication based on network address mutation according to an embodiment of the present invention.

Here, at step S140, the server apparatus 300 receives a packet from the client apparatus through any one of the multiple external addresses recorded in the table, thereby maintaining the network connection between the server apparatus 300 and the client apparatus 200. FIG. 6 is a view that shows a method for communication based on network address mutation according to an embodiment of the present invention.

Referring to FIG. 6, in the state in which the server apparatus 300 and the client apparatus 200 complete the initial network configuration as described above, the packet flow, generated when a hidden tunnel is generated in such a way that the client apparatus 200 accesses the hidden interface of the server apparatus 300, may be represented as shown in FIG. 6. As shown in FIG. 6, the connection generated as a hidden tunnel is not lost even though the IP address of the external address (the IP address of eth0) of the server is changed, and direct access only to the external interface is allowed.

Here, when the client apparatus 200 attempts to access the external interface of the server apparatus 300 by satisfying a specific condition at a specific time, the server apparatus 300 may determine the access attempt by the client apparatus 200 to be valid and establish a connection to a hidden tunnel by forwarding a packet to the hidden interface. Here, the specific time and the specific condition is hidden information that is not disclosed to an attacker, and may be information about a preset address mutation rule.

Figure 7:
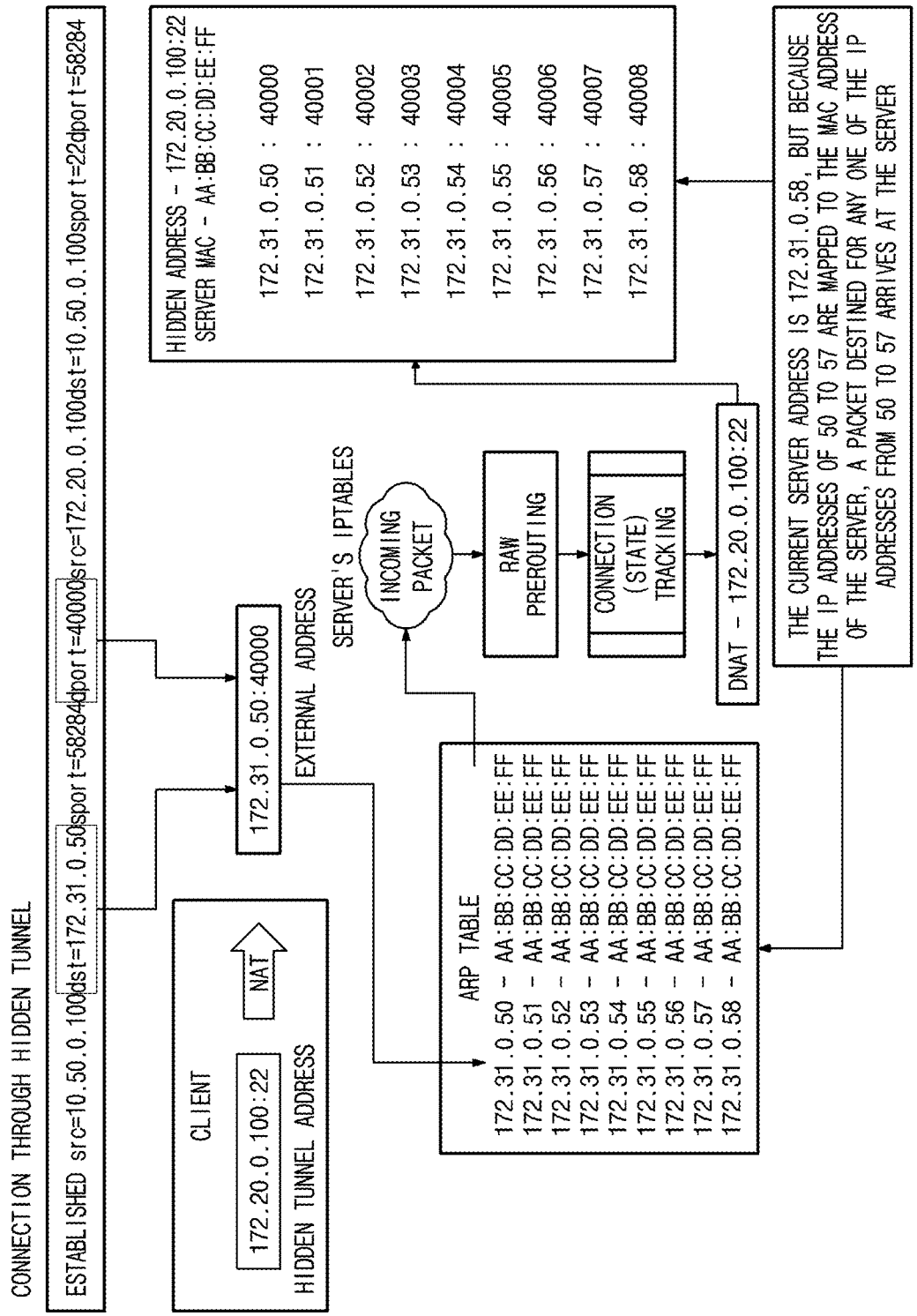
FIG. 7 is a view that shows packet forwarding through N:1 mapping in an Address Resolution Protocol (ARP) table according to an embodiment of the present invention.

FIG. 7 is a view that shows packet forwarding through N:1 mapping in an ARP table according to an embodiment of the present invention.

Referring to FIG. 7, through the server apparatus 300, the client apparatus 200, and the method for communication based on network address mutation according to an embodiment of the present invention, server tracking through packet eavesdropping may be prevented.

Here, the method for communication based on network address mutation according to an embodiment of the present invention may respond to an attack model in which an attacker that intrudes into a network finds the current address that enables access to the server apparatus 300 by monitoring the traffic between the server apparatus 300 and the client apparatus 200 and by checking the header of an IP packet through packet eavesdropping.

For example, it may be assumed that the address of the server apparatus 300 changes to any one of A1 to A10. If connection to A1 is established, A1 may be recorded as the IP address of the server apparatus 300 in a packet when the destination or the source of the packet is set. Then, even though the address of the server apparatus 300 changes to any one of A2 to A10, the connection is maintained, but the address set when the connection to A1 is established may be recorded as the address of the server apparatus 300 in the packet header.

That is, regardless of the current address of the server apparatus, network communication may be performed using the external address of the previously established connection. Accordingly, after the address is changed from A1 to another address, an attacker is not able to determine the current address of the server apparatus 300 even though the attacker eavesdrops on packets.

However, it is possible that the attacker finds the address of the server apparatus 300 by eavesdropping on packets before connection to A1 is finished. That is, before the corresponding connection is disconnected in the next address mutation period, the attacker may secure sufficient time to launch an attack.

Accordingly, in order to enable a packet, the destination of which differs from the address of the server apparatus 300, to arrive at the server apparatus 300, the present invention may use an Address Resolution Protocol (ARP) table in which multiple IP addresses are mapped to a MAC address through N:1 mapping.

It may be assumed that the MAC address of the server apparatus 300 is MAC[S] and that the IP address thereof changes to any one of IP_T1 [S] to IP_T10[S]. When connection to IP_T1[S] is established, {IP_T1[S]: MAC[S]} is recorded in the ARP table. Then, when the IP address of the server apparatus 300 is changed during communication, {IP_T1[S]~IP_T10[S]: MAC[S]} may be recorded in the ARP table. Accordingly, even though the IP address varies on the network, a packet may reach at least the external interface of the server apparatus 300 because the MAC address thereof is fixed.

Subsequently, through the local packet processing flow on the OS and a destination NAT table set in the initial network configuration process, the destination IP address of a packet may be changed to the internal address (hidden address) as soon as the packet is passed to an OS layer, and whether the packet matches the IP address of the server apparatus 300 may be determined. Because the server apparatus 300 has a hidden interface generated upon the initial network configuration process as well as the external interface thereof, when the packet is recognized as the packet destined therefor, the packet may be passed to the upper layer via the IP layer.

Because the above-described method is based on N:1 mapping in the ARP table, if any of N addresses falling within the IP address mutation range of the server apparatus 300 is assigned to another server apparatus, the connection is disconnected. Therefore, respective server apparatuses 300 that perform address mutation are required to split addresses that fall within an address range allocated to their subnetwork therebetween and to avoid using addresses assigned to other server apparatuses. If the above conditions are applied when there are N server apparatuses 300 based on Class-C IP addresses, the complexity of prediction of a hidden tunnel by an attacker may be represented as shown in Equation (6).

Figure 8:
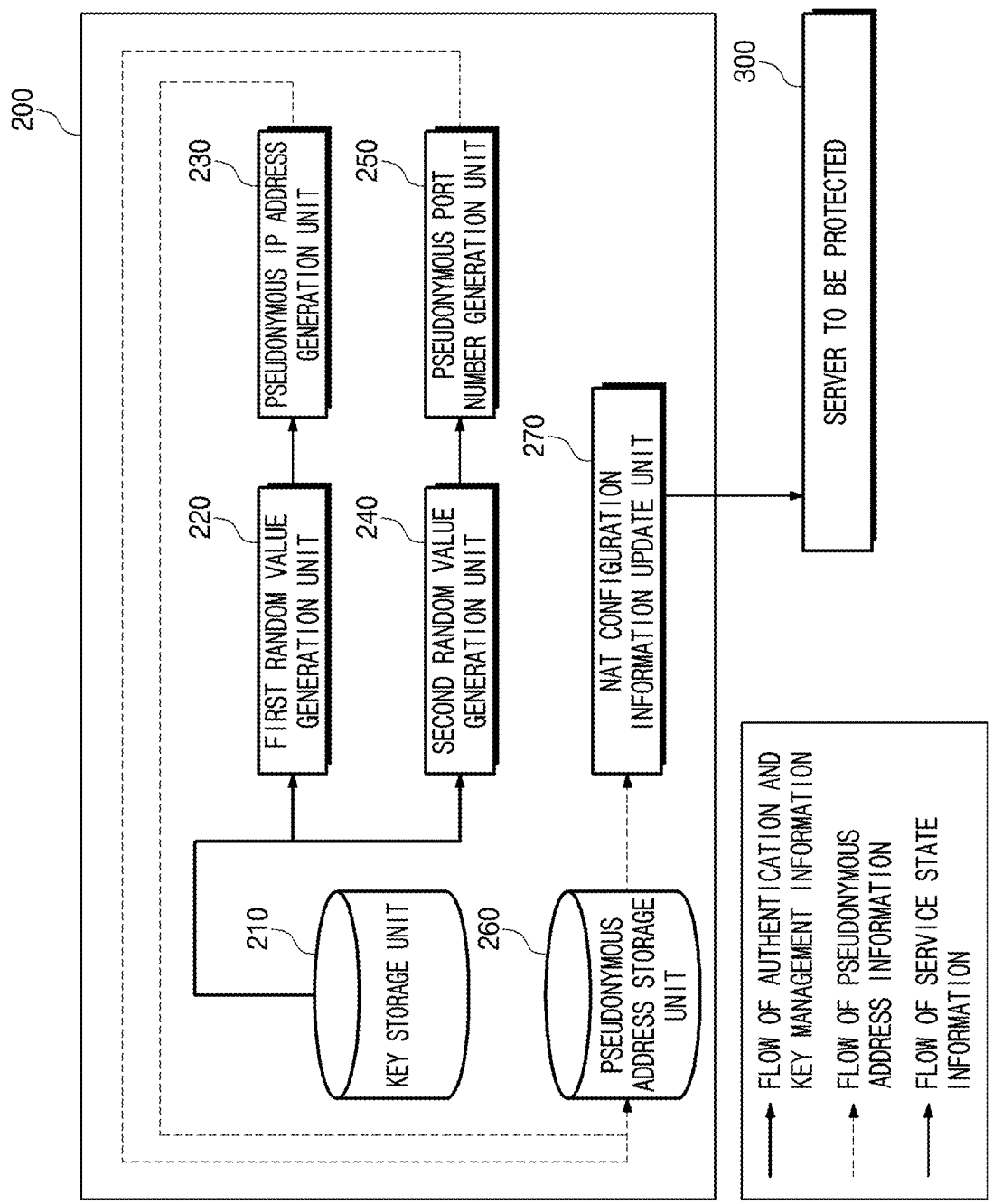
FIG. 8 is a block diagram that shows a client apparatus for a method for communication based on network address mutation according to an embodiment of the present invention.

FIG. 8 is a block diagram that shows a client apparatus for a method for communication based on network address mutation according to an embodiment of the present invention.

Referring to FIG. 8, the client apparatus 200 for a method for communication based on network address mutation according to an embodiment of the present invention may include a key storage unit 210, a first random value generation unit 220, a pseudonymous IP address generation unit 230, a second random value generation unit 240, a pseudonymous port number generation unit 250, a pseudonymous address storage unit 260, and a NAT configuration information update unit 270.

The key storage unit 210 may perform authentication for a server apparatus 300 through an authentication server 100 and store a session key, which is generated and distributed thereto.

The first random value generation unit 220 may generate a first random value to be used to generate a pseudonymous IP address, which is used for network address mutation.

The pseudonymous IP address generation unit 230 may generate a pseudonymous IP address through a one-way hash function using the session key and the first random value based on a preset address mutation rule. A detailed description of the process of generating the pseudonymous IP address is included in a description of step S131.

The second random value generation unit 240 may generate a second random value to be used to generate a pseudonymous port number, which is used for network address mutation.

The pseudonymous port number generation unit 250 may generate a pseudonymous port number through a one-way hash function using the session key and the second random value based on the preset address mutation rule. A detailed description of the process of generating the pseudonymous port number is included in a description of step S131.

The pseudonymous address storage unit 260 may store the generated multiple pseudonymous IP addresses and the generated multiple pseudonymous port numbers as pseudonymous address information.

The NAT configuration information update unit 270 may generate a packet so as to include a destination address for communicating with the external address of the network interface of the server apparatus 300 using the pseudonymous address information based on the preset address mutation rule.

The NAT configuration information update unit 270 may generate a packet so as to include the source address of the client apparatus 200 based on the preset address mutation rule such that the packet is forwarded to the hidden address of the server apparatus 300.

The NAT configuration information update unit 270 may be configured such that the destination address of a packet to be transmitted to a hidden interface of the server apparatus 300, among outgoing packets destined for the server apparatus 300, is set based on destination NAT (IP address/port number).

Here, the NAT configuration information update unit 270 includes the same address generation mechanism as the server apparatus 300 such that the address is continuously changed, whereby the external address of the network interface of the server apparatus 300 may be tracked.

Figure 9:
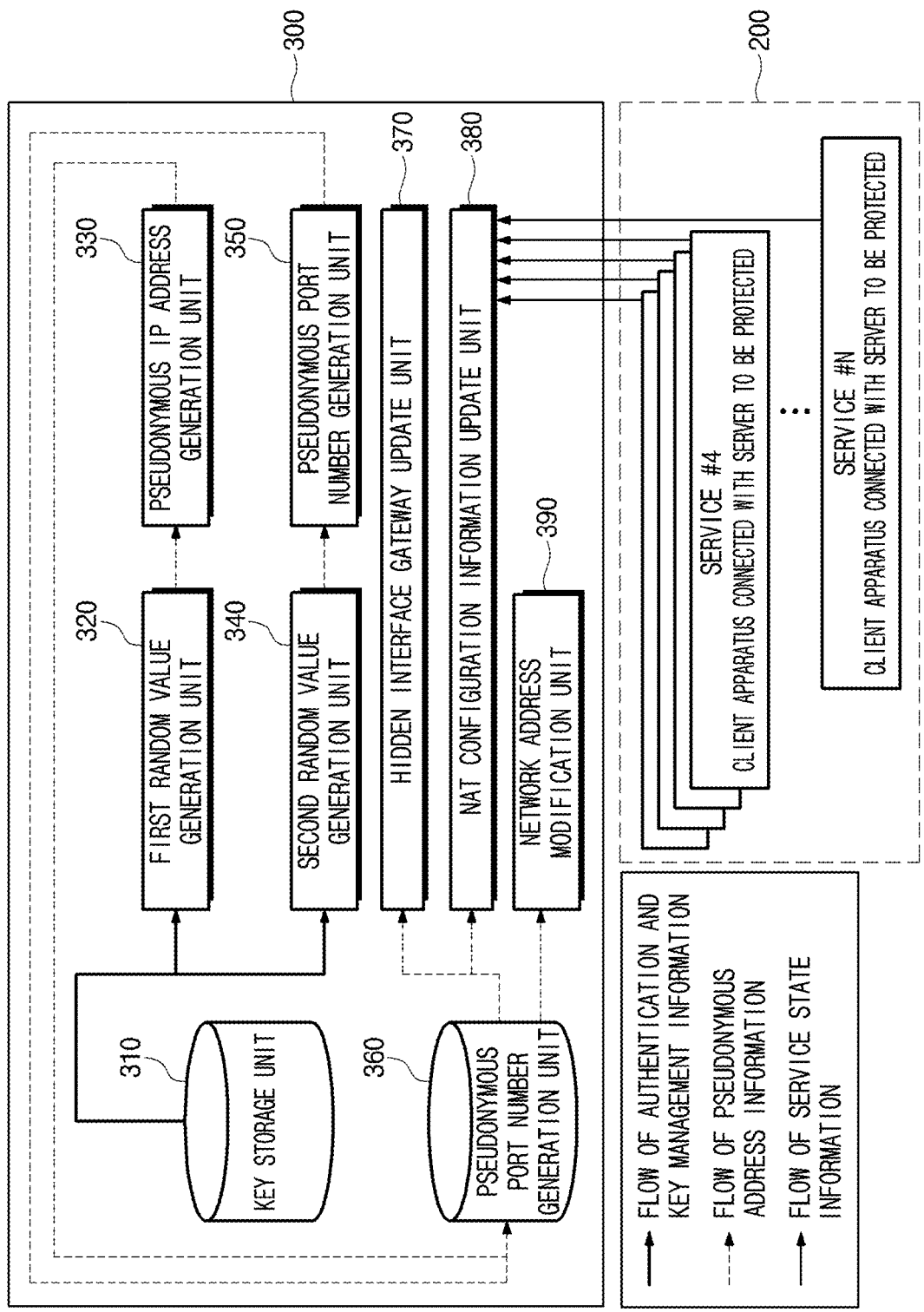
FIG. 9 is a block diagram that shows a server apparatus for a method for communication based on network address mutation according to an embodiment of the present invention.

FIG. 9 is a block diagram that shows a server apparatus for a method for communication based on network address mutation according to an embodiment of the present invention.

Referring to FIG. 9, the server apparatus 300 for a method for communication based on network address mutation according to an embodiment of the present invention may include a key storage unit 310, a first random value generation unit 320, a pseudonymous IP address generation unit 330, a second random value generation unit 340, a pseudonymous port number generation unit 350, a pseudonymous address storage unit 360, a hidden interface gateway update unit 370, a NAT configuration information update unit 380, and a network address modification unit 390.

The key storage unit 310 may perform authentication for a client apparatus 200 through an authentication server 100 and store a session key, which is generated and distributed thereto.

The first random value generation unit 320 may generate a first random value to be used to generate a pseudonymous IP address, which is used for network address mutation.

The pseudonymous IP address generation unit 330 may generate a pseudonymous IP address through a one-way hash function using the session key and the first random value based on a preset address mutation rule. A detailed description of the process of generating a pseudonymous IP address is included in a description of step S131.

The second random value generation unit 340 may generate a second random value to be used to generate a pseudonymous port number, which is used for network address mutation.

The pseudonymous port number generation unit 350 may generate a pseudonymous port number through a one-way hash function using the session key and the second random value based on the preset address mutation rule. A detailed description of the process of generating a pseudonymous port number is included in a description of step S131.

The pseudonymous address storage unit 360 may store the generated multiple pseudonymous IP addresses and the generated multiple pseudonymous port numbers as pseudonymous address information.

The hidden interface gateway update unit 370 may configure a hidden interface before address mutation in order to configure a hidden tunnel for communicating with the client apparatus 200 even though the external address is changed.

Here, the hidden interface gateway update unit 370 may generate a hidden interface having a MAC address.

Here, the hidden interface gateway update unit 370 may assign an arbitrary IP address (hidden address) to the hidden interface, thereby setting an internal address (IP address, netmask).

Here, the hidden interface gateway update unit 370 may change the address of the default gateway of the hidden interface to the modified external address.

The NAT configuration information update unit 380 may be configured such that the destination address of a packet entering through a port matching the pseudonymous address information, among incoming packets from the client apparatus 200, is set based on destination NAT (IP address/port number) in order to forward the corresponding packet to the hidden interface.

Here, the NAT configuration information update unit 380 may be configured such that the source address of a packet originating from the connection with the hidden interface, among outgoing packets destined for the client apparatus 200, is set based on source NAT (IP address/port number).

Here, the NAT configuration information update unit 380 may update a configuration table in order to forward a packet satisfying the address mutation rule to the address based on destination NAT, among incoming packets received through the external address of the network interface.

Here, the NAT configuration information update unit 380 may update the configuration table in order to drop a packet that does not satisfy the address mutation rule, among incoming packets received through the external address of the network interface.

The network address modification unit 390 may set the address of the default gateway of the hidden interface as the external address (IP address) of the network interface for which address mutation is to be performed.

Here, the network address modification unit 390 may continuously modify the external address of the network interface based on the process of the pseudonymous address information generation step (S131) at specific times set according to a preset period.

Here, the network address modification unit 390 may update the network configuration in order to prevent a connection from being lost whenever the external address is modified.

Here, the network address modification unit 390 may modify the external address (the IP address of eth0) of the network interface based on the preset network address mutation rule.

Here, the network address modification unit 390 may modify the external address using any one of the multiple pseudonymous IP addresses and any one of the multiple pseudonymous port numbers based on the preset address mutation rule at preset periods, the multiple pseudonymous IP addresses and the multiple pseudonymous port numbers being included in the pseudonymous address information.

Figure 10:
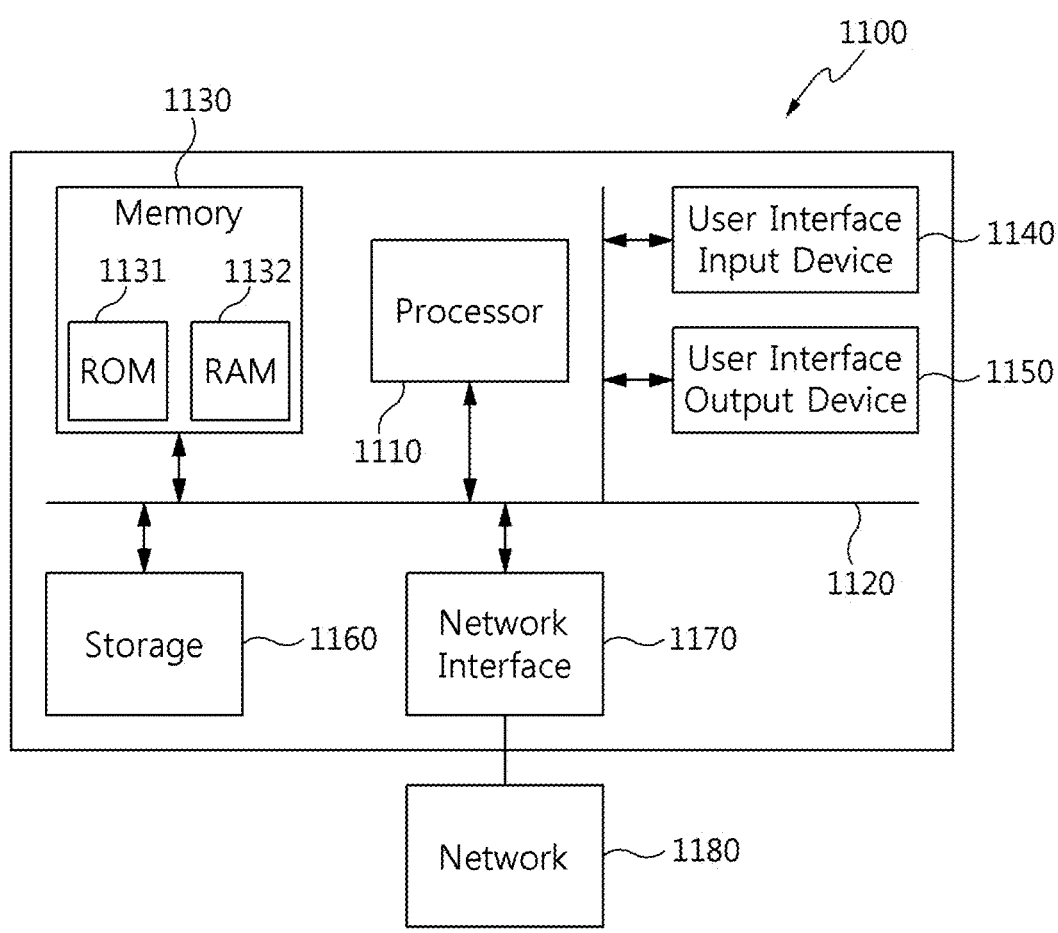
FIG. 10 is a view that shows a computer system according to an embodiment of the present invention.

FIG. 10 is a view that shows a computer system according to an embodiment of the present invention.

Referring to FIG. 10, the authentication server 100, the client apparatus 200, and the server apparatus (the server to be protected) 300 may be implemented as a computer system 1100 including a computer-readable recording medium. As illustrated in FIG. 10, the computer system 1100 may include one or more processors 1110, memory 1130, a user-interface input device 1140, a user-interface output device 1150, and storage 1160, which communicate with each other via a bus 1120. Also, the computer system 1100 may further include a network interface 1170 connected to a network 1180. The processor 1110 may be a central processing unit or a semiconductor device for executing processing instructions stored in the memory 1130 or the storage 1160. The memory 1130 and the storage 1160 may be any of various types of volatile or nonvolatile storage media. For example, the memory may include ROM 1131 or RAM 1132.

Here, the server apparatus 300 according to an embodiment of the present invention includes one or more processors and executable memory for storing at least one program executed by the one or more processors. The at least one program may be executed so as to communicate with the client apparatus 200 through the processes of setting the external address of a network interface for receiving a packet from the client apparatus 200, setting the internal address of a hidden interface in order to forward the packet received through the network interface to the hidden interface, modifying the external address based on a preset network address mutation rule, and forwarding the packet, received from the client apparatus 200 through the modified external address, to the hidden interface.

Here, the at least one program of the server apparatus 300 may perform authentication for the client apparatus 200 through the authentication server 100 and share a session key with the successfully authenticated client apparatus 200.

Here, the at least one program of the server apparatus 300 may generate pseudonymous address information to be used to set the external address of the network interface for receiving a packet from the client apparatus 200.

Here, the at least one program of the server apparatus 300 may generate pseudonymous address information that includes multiple pseudonymous IP addresses and multiple pseudonymous port numbers generated from random values using a preset function.

Here, the preset function may generate random values using the session key.

Here, the at least one program of the server apparatus 300 may change the address of the gateway of the hidden interface to the modified external address.

Here, the at least one program of the server apparatus 300 may map the external address, identified at the time when connection with the client apparatus 200 is established, to the Media Control Access (MAC) address of the server apparatus and record the mapped addresses in a table.

Here, each of the multiple external addresses may be mapped to the MAC address and recorded in the table, and the table may be an ARP table.

Here, the at least one program of the server apparatus 300 may receive a packet from the client apparatus through any one of the multiple external addresses recorded in the table, whereby the network connection with the client apparatus 200 may be maintained.

Here, the at least one program of the server apparatus 300 may forward a packet, received from the client apparatus 200, to the hidden interface when the first source address information of the client apparatus 200, which is predefined based on the preset address mutation rule, is the same as the second source address information of the client apparatus 200, which is included in the packet.

Here, the one or more processors of the server apparatus 300 may block the access by the client apparatus when the first source address information of the client apparatus 200, which is predefined based on the preset address mutation rule, is not identical to the second source address information of the client apparatus 200, which is included in the packet received from the client apparatus 200.

Here, the one or more processors of the server apparatus 300 may include the source address information of the server apparatus 300, corresponding to the hidden address, in a packet based on the preset address mutation rule and transmit the packet to the client apparatus 200.

Also, the client apparatus 200 according to an embodiment of the present invention may include one or more processors and executable memory for storing at least one program executed by the one or more processors. The at least one program may be executed so as to communicate with the server apparatus 300 by setting the external address of the network interface of the server apparatus 300 in order to transmit a packet thereto, by setting the external address, which is modified based on a preset address mutation rule, as a destination address, and by transmitting the packet to the external address of the server apparatus 300.

Here, the at least one program of the client apparatus 200 may perform authentication for the server apparatus 300 through the authentication server 100 and share a session key with the server apparatus 300.

Here, the at least one program of the client apparatus 200 may generate pseudonymous address information in order to track the external address of the network interface of the server apparatus 300.

Here, the at least one program of the client apparatus 200 may generate pseudonymous address information that includes multiple pseudonymous IP addresses and multiple pseudonymous port numbers generated from random values using a preset function.

Here, the preset function may generate random values using the session key.

Here, the at least one program of the client apparatus 200 may include the source address thereof in a packet in order to forward the packet to the hidden address of the server apparatus 300 based on the preset address mutation rule, and may transmit the packet to the server apparatus 300.

Here, the at least one program of the client apparatus 200 may generate pseudonymous address information to be used to track the external address of the network interface through which the server apparatus 300 receives a packet from the client apparatus 200.

The present invention may provide a proactive security technique, which increases costs for reconnaissance performed by an attacker in a network environment.

Also, the present invention may provide a secure communication channel between legitimate entities included in a network.

As described above, the server apparatus, the client apparatus, and the method for communication based on network address mutation according to the present invention are not limitedly applied to the configurations and operations of the above-described embodiments, but all or some of the embodiments may be selectively combined and configured, so that the embodiments may be modified in various ways.

What is claimed is:

1. A method for communication based on network address mutation, performed by a server apparatus and a client apparatus, comprising:
    setting an external address of a network interface for receiving a packet from the client apparatus, and setting an internal address of a hidden interface in order to forward the packet, received through the network interface, to the hidden interface;
    modifying the external address based on a preset network address mutation rule; and
    communicating with the client apparatus by forwarding the packet received from the client apparatus through the modified external address to the hidden interface,
    wherein the setting the external address is configured to set an IP address and a port corresponding to a destination of the packet as the internal address of the hidden interface,
    wherein the modifying the external address is configured to modify the external address based on the preset network address mutation rule at a preset period by the server apparatus and the client apparatus, and
    wherein the communicating with the client apparatus is configured to forward the received packet to the internal address of the hidden interface when a port of the received packet from the modified external address based on the preset network address mutation rule at the preset period is same as the set port of the internal address.

2. The method of claim 1, further comprising:
    after modifying the external address, changing an address of a gateway of the hidden interface to the modified external address.

3. The method of claim 1, wherein the communicating with the client apparatus is configured to map the external address, identified at a time at which connection between the server apparatus and the client apparatus is established, to a Media Access Control (MAC) address of the server apparatus and to store a result of the mapping in a table.

4. The method of claim 3, wherein each of multiple external addresses including the external address is mapped to the MAC address and recorded in the table.

5. The method of claim 4, wherein the communicating with the client apparatus is configured to receive a packet from the client apparatus through any one of the multiple external addresses recorded in the table, thereby maintaining network connection between the server apparatus and the client apparatus.

6. The method of claim 1, further comprising:
    before setting the external address, generating the pseudonymous address information used to set and/or modify the external address of the network interface, through which the server apparatus receives a packet from the client apparatus.

7. The method of claim 6, wherein the generating the pseudonymous address information is configured to generate the pseudonymous address information including multiple pseudonymous IP addresses and multiple pseudonymous port numbers generated from random values using a preset function.

8. The method of claim 7, wherein the modifying the external address is configured to modify the external address using any one of the multiple pseudonymous IP addresses and any one of the multiple pseudonymous port numbers based on the preset network address mutation rule at preset intervals, the multiple pseudonymous IP addresses and the multiple pseudonymous port numbers being included in the pseudonymous address information.

9. The method of claim 8, further comprising:
before the generating the pseudonymous address information, performing authentication for the server apparatus and the client apparatus and sharing the session key between the successfully authenticated server apparatus and client apparatus.

10. The method of claim 9, wherein the preset function generates the random values using the session key.

11. A server apparatus, comprising:
one or more processors; and
executable memory for storing at least one program executed by the one or more processors,
wherein the at least one program is configured to set an external address of a network interface for receiving a packet from a client apparatus, to set an internal address of a hidden interface in order to forward the packet received through the network interface to the hidden interface, to modify the external address based on a preset network address mutation rule, and to forward the packet received from the client apparatus through the modified external address to the hidden interface, thereby communicating with the client apparatus, to set an IP address and a port corresponding to a destination of the packet as the internal address of the hidden interface, to modify the external address based on the preset network address mutation rule at a preset period by the server apparatus and the client apparatus, and to forward the received packet to the internal address of the hidden interface when a port of the received packet from the modified external address based on the preset network address mutation rule at the preset period is same as the set port of the internal address.

12. The server apparatus of claim 11, wherein the at least one program changes an address of a gateway of the hidden interface to the modified external address.

13. The server apparatus of claim 12, wherein the at least one program maps the external address, identified at a time at which connection with the client apparatus is established, to a Media Access Control (MAC) address of the server apparatus and records a result of the mapping in a table.

14. The server apparatus of claim 13, wherein each of multiple external addresses including the external address is mapped to the MAC address and recorded in the table.

15. The server apparatus of claim 14, wherein the at least one program receives a packet from the client apparatus through any one of the multiple external addresses recorded in the table, thereby maintaining network connection with the client apparatus.

16. The server apparatus of claim 11, wherein the at least one program generates the pseudonymous address information used to set and/or modify the external address of the network interface for receiving a packet from the client apparatus.

17. The server apparatus of claim 16, wherein the at least one program generates the pseudonymous address information including multiple pseudonymous IP addresses and multiple pseudonymous port numbers generated from random values using a preset function.

18. The server apparatus of claim 17, wherein the at least one program performs authentication for the client apparatus and shares the session key with the successfully authenticated client apparatus.

19. The server apparatus of claim 18, wherein the preset function generates the random values using the session key.

20. A client apparatus, comprising:
one or more processors; and
executable memory for storing at least one program executed by the one or more processors,
wherein the at least one program is configured to set an external address of a network interface of a server apparatus in order to transmit a packet to the server apparatus, to set the external address modified based on a preset address mutation rule as a destination address, and to transmit the packet to the external address of the server apparatus, thereby communicating with the server apparatus,
wherein server apparatus is configured to set an IP address and a port corresponding to a destination of the packet as an internal address, to modify the external address based on the preset network address mutation rule at a preset period by the server apparatus and the client apparatus, and to forward the received packet to the internal address when a port of the received packet from the modified external address based on the preset network address mutation rule at the preset period is same as the set port of the internal address.

* * * * *